United States Patent [19]

Michalski et al.

[11] Patent Number: 4,700,569

[45] Date of Patent: Oct. 20, 1987

[54] METHOD AND ARRANGEMENT FOR SIGNAL TRANSMISSION IN ULTRASONIC ECHO SOUNDING SYSTEMS

[75] Inventors: Bernhard Michalski, Schopfheim; Jürgen Lau, Weil am Rhein; Wolfram Berger, Steinen, all of Fed. Rep. of Germany

[73] Assignee: Endress u. Hauser GmbH u. Co., Fed. Rep. of Germany

[21] Appl. No.: 667,906

[22] Filed: Nov. 2, 1984

[30] Foreign Application Priority Data

Nov. 4, 1983 [DE] Fed. Rep. of Germany ....... 3339968
Oct. 17, 1984 [DE] Fed. Rep. of Germany ....... 3438045

[51] Int. Cl.$^4$ ............................................. G01F 23/28
[52] U.S. Cl. ................................. 73/290 V; 364/509; 367/908; 374/142
[58] Field of Search ............... 73/290 R, 290 V; 364/509; 374/141, 142; 367/908

[56] References Cited

U.S. PATENT DOCUMENTS

| | | | |
|---|---|---|---|
| 3,603,149 | 9/1971 | Mckown | 73/290 V |
| 4,114,441 | 9/1978 | Magri | 73/290 V |
| 4,203,324 | 5/1980 | Baumoel | 73/290 V |
| 4,221,004 | 9/1980 | Combs et al. | 73/290 V |
| 4,229,798 | 10/1980 | Rosie et al. | 73/290 V |
| 4,403,508 | 9/1983 | Langlois | 73/290 V |
| 4,414,849 | 11/1983 | Brown et al. | 73/290 V |
| 4,470,299 | 9/1984 | Soltz | 73/290 V |
| 4,491,008 | 1/1985 | Marini et al. | 73/290 V |
| 4,523,465 | 6/1985 | Fasching et al. | 73/290 V |

*Primary Examiner*—Daniel M. Yasich
*Attorney, Agent, or Firm*—Barnes & Thornburg

[57] ABSTRACT

An ultrasonic echo sounding apparatus disposed at a measuring location transmits ultrasonic pulses in successive transmission periods. The echo pulses received after reflection at a target are converted to electrical envelope signals which represent the envelope curves of the echo pulses. The envelope signals are transmitted via a connecting line to an evaluation apparatus disposed at an evaluation station remote from the measuring location. In the evaluation apparatus the envelope signals are evaluated for determining the target distance from the travel time of the ultrasonic pulses. The transmission of envelope signals results in the advantage that the information contained in the pulse shape of the echo pulses is available in the evaluation station, although it is not necessary to transmit signals having the high frequency of the ultrasonic pulses via the connecting line. Preferably, the envelope signals are transmitted in a first section of each transmission period, and low-frequency signals which are generated at the measuring location and are characteristic of parameters necessary for the evaluation of the envelope signals are transmitted in a second section of each transmission period. It is also possible to transmit control signals from the evaluation station to the measuring location during the second section of every transmission period.

24 Claims, 7 Drawing Figures

METHOD AND ARRANGEMENT FOR SIGNAL TRANSMISSION IN ULTRASONIC ECHO SOUNDING SYSTEMS

The invention relates to a method for signal transmission between an ultrasonic echo sounding apparatus disposed at a measuring location and an evaluation station remote from the measuring location, ultrasonic pulses being transmitted at the measuring location in successive transmission periods and the echo pulses received after reflection at a target converted to electrical signals which are transmitted via a connecting line to the evaluation station and there evaluated for determining the target distance from the travel time of the ultrasonic pulses.

A frequent use of the method indicated above is the filling level measurement in a container with the aid of an ultrasonic sounding device. For this purpose, in the container above the maximum level which occurs an ultrasonic tranducer is disposed which transmits ultrasonic transmission pulses which strike the surface of the material with which the container is filled. The ultrasonic echo pulses reflected at the material are received by the same or by a second ultrasonic transducer and converted to electrical reception signals. From the travel time of the ultrasonic pulses the distance of the material surface from the ultrasonic transducer and thus the filling level in the container can be calculated. The excitation of the ultrasonic transducer for transmitting ultrasonic pulses is by electrical high-frequency pulses with the frequency of the ultrasonic wave. These excitation pulses may have any desired pulse shape (envelope curve), for example be shaped rectangularly. The electrical reception signals furnished by the ultrasonic transducer on receiving the echo pulses are high-frequency pulses of the same frequency but with a waveform which due to the transmission function of the ultrasonic transducer and the propagation medium of the ultrasonic wave differs from the waveform of the excitation pulses. Furthermore, the amplitude of the reception signals is very small compared with the amplitude of the excitation pulses.

In many uses of echo sounding devices, in particular filling level measurement, it is necessary to have the measurement result available at a place remote from the measuring location. Firstly, access to the measuring location is frequently difficult and the conditions which obtain there are usually unfavorable; secondly, it is desirable to collect the measurement results of many measuring stations in a central station.

It is known to arrange the entire electronic system at an evaluation station remote from the measuring location so that at the measuring location only the ultrasonic transducer is located which via a connecting line is connected to the electronics of the evaluation station. In this case the high-frequency excitation pulses are generated at the evaluation station and transmitted to the ultrasonic transducer at the measuring location and the high-frequency output signals of the ultrasonic transducer are sent back to the evaluation station. With this method the evaluation of the high-frequency reception signals is at the evaluation station where they can be analyzed in any desired manner. For the transmission of high-frequency signals in both directions, however, shielded special cables are necessary whose line length is limited because the electrical high-frequency pulses generated by the ultrasonic transducer on the basis of the ultrasonic echo pulses are relatively weak. Furthermore, there is a danger of interferences being superimposed along the transmission path and consequently such a system is sensitive to interference. Finally, the evaluating apparatus must be exactly adapted to the particular ultrasonic transducer used so that for each measuring station a separate evaluating apparatus is necessary and any change requires renewed adaptation.

In another known system a substantial part of the electronics is located at the measuring location in the immediate vicinity of the ultrasonic transducer. These local electronics include a transmission pulse generator which generates the electrical high-frequency pulses for exciting the ultrasonic transducer. Furthermore, the local electronics include a reception and measuring circuit which amplifies the electrical reception signals furnished by the ultrasonic transducer and processes them to determine the travel time between transmission and reception. The entire evaluation of the reception signals thus takes place in the local electronics. The reception and measuring circuit generates an output signal which is dependent on the travel time and which can be transmitted without any problem to a remote station, for example a direct current varying between 4 and 20 mA. This method permits the use of normal installation cables of any line length so that the observation station can be at any desired distance from the measuring location. The signal transmission is interference-proof. However, with this method a great deal of information which is contained in the pulse shape of the reception signals, such as acoustic conditions in the container, reflection properties of the material to be measured, satisfactory operating of the electronics and ultrasonic transducer, etc., is no longer present in the observation station. It can thus happen that a level is indicated but it is not possible to verify in the observation station how this indication came about and whether it is correct.

It is an object of the invention to provide a method which permits interference-proof signal transmission in ultrasonic sounding systems via ordinary cables of any length and in which the reception signals can be analyzed in the evaluation station remote from the measuring location to obtain a maximum amount of information without the need of any special adaptation of the evaluation apparatus to the particular ultrasonic transducer used.

According to the invention this problem is solved in that at the measuring location electrical envelope signals are generated which represent the envelope curves of the echo pulses and that the envelope signals are transmitted via the connecting line to the evaluation station.

The invention is based on the recognition that all the information necessary for the evaluation of the reception signals is contained in the envelope curve thereof and that the carrier frequency is not needed for this purpose. The envelope signals generated at the measuring location thus contain all the necessary information. The transmission of the envelope signals from the measuring location to the evaluation station is possible without any problem and no danger of interference through normal cables of any length because the envelope signals have a substantially lower frequency and smaller bandwidth than the pulse-modulated high-frequency signals. The envelope signals can be processed in the evaluation station in any desired manner to recover the necessary measured values, in particular of course for measuring the travel time of the ultrasonic pulses. In addition, the envelope signals can be analyzed in the evaluation station for recovering additional information, for example information on the transmission conditions in the container, for statistical selection with regard to time coincidence of the signals, detection of double reflections, gating out of undesired fixed targets (interference reflections), detection of the drop of the signal level below a certain limit value, monitoring of the correct functioning of the local electronics and ultrasonic transducer, etc.

The processing of the envelope signals does not require any special adaptation of the evaluating apparatus to sensor-specific data such as the ultrasonic frequency used, the impedance of the ultrasonic transducer or the like. This makes it possible in particular to connect different ultrasonic transducers to the same evaluating apparatus without having to adjust the latter each time. This affords the possibility of connecting a relatively large number of ultrasonic sounding apparatuses to the same evaluating apparatus, thus enabling the number of evaluating apparatuses necessary for example for measuring the levels in a large number of containers to be considerably reduced.

A preferred further development of the method according to the invention resides in that the generation and transmission of the envelope signals takes place in a first section of each transmission period whose duration is at least equal to the maximum travel time of the ultrasonic pulses occurring, and that low-frequency electrical signals which are generated at the measuring location and are characteristic of parameters necessary for the evaluation of the envelope signals are transmitted via the same connecting line to the evaluation station, in a second section of each transmission period.

The transmission of further low-frequency electrical signals via the same connecting line makes it possible in the evaluation station to gather additional information and to improve the measuring accuracy and the reliability as regards interference. Thus, for example, the temperature of the propagation medium of the ultrasonic wave (i.e. the air in the container above the material) is an information important to the accuracy of the level measurement because the propagation velocity of the ultrasonic wave depends on the temperature and the temperature thus enters into the calculation of the distance covered from the travel time measured. Preferably, therefore, one of the additional signals transmitted is characteristic of the temperature of the propagation medium. The proof against interference can be improved by bringing the reception signals in the local electronics, which are very weak and have very different levels depending on the measured distance, to an adequately high level by a gain control. However, this results in loss of the information contained in the echo amplitude which is an indication of various transmission conditions. Consequently, it is preferable for one of the additionally transmitted signals to be characteristic of the amplitude of the received echo pulses. This signal may be derived for example from the gain control voltage.

The division of each transmission period into two sections further affords the possibility of transmitting during every second section at least one control signal which is distinguishable from the low-frequency electrical signals transmitted in the same section via the same connecting line from the evaluation station to the measuring location without impairing the transmission of the envelope signals. This makes it possible to control certain functions in the local electronics from the evaluation station. For example, the gain of the amplifier in the local electronics can be set from the evaluation station.

An arrangement for carrying out the method according to the invention and comprising at least one ultrasonic transducer disposed at the measuring location, local electronics disposed at the measuring location and including a transmission pulse generator which generates electrical high-frequency transmission pulses and the output of which is connected to the or an ultrasonic transducer, an amplifier whose input is connected to the or an ultrasonic transducer and a control unit controlling the time sequence, and an evaluating apparatus which is located at the evaluation station and which is connected by the connecting line to the local electronics, is characterized according to the invention in that the local electronics include an envelope signal generating circuit following the amplifier and a means for connecting the output of the envelope signal generating circuit to the connecting line, and that the evaluating apparatus includes a signal processing circuit able to process envelope signals.

Further features and advantages of the invention will be apparent from the following description of an example of embodiment with the aid of the drawings, wherein.

Figure 2:
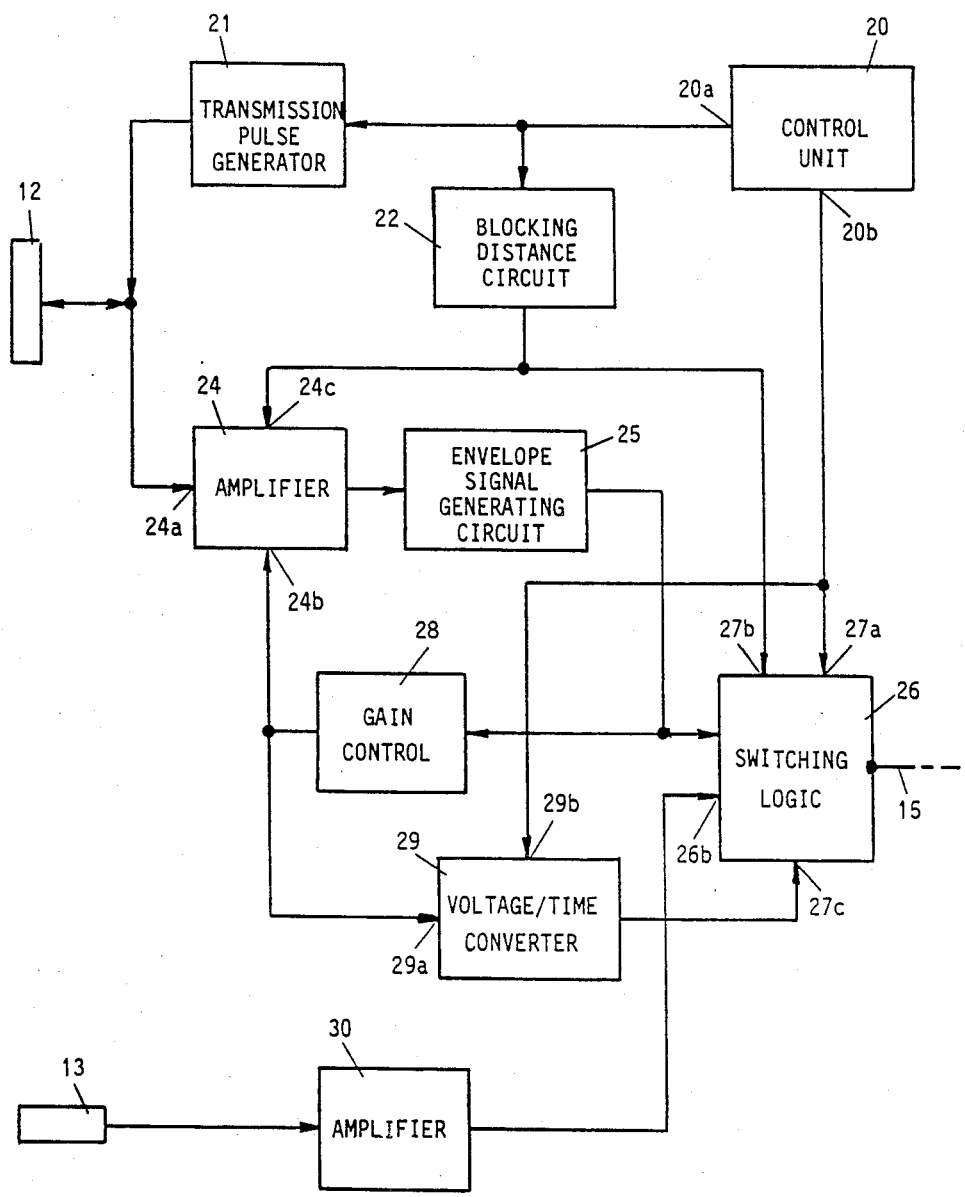
FIG. 2 is the block circuit diagram of the local electronics of the arrangement of FIG. 1.
Figure 3:
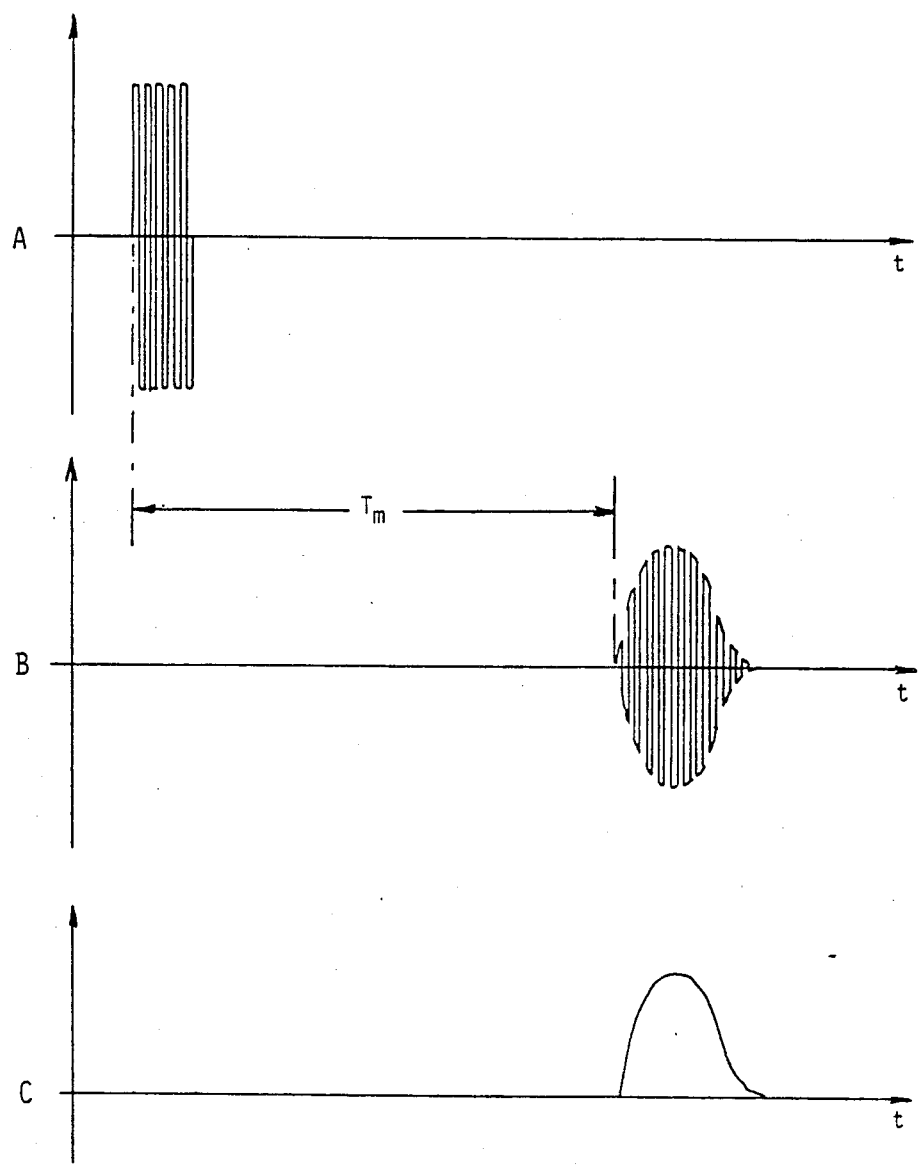
Figure 4:
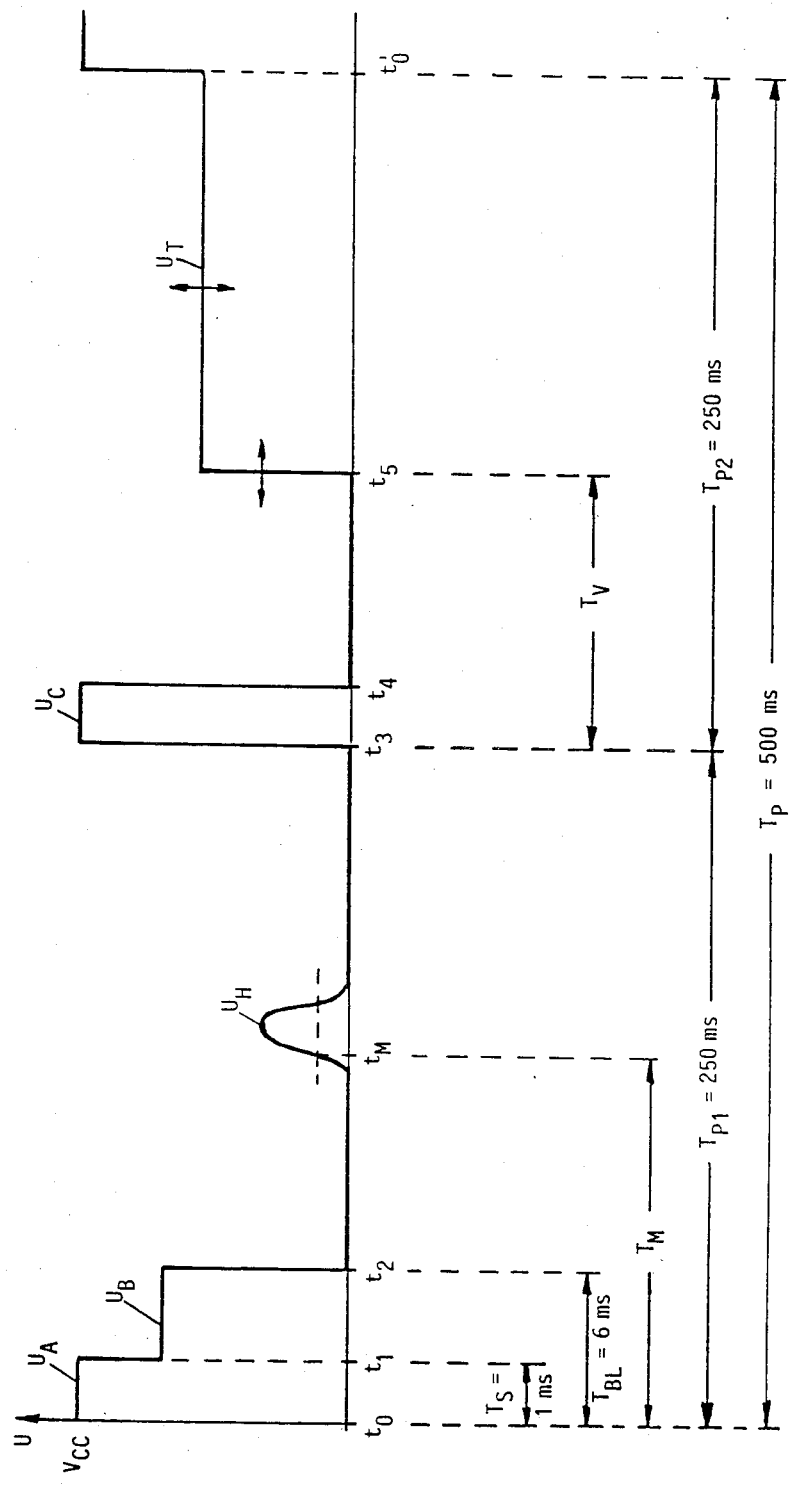
Figure 5:
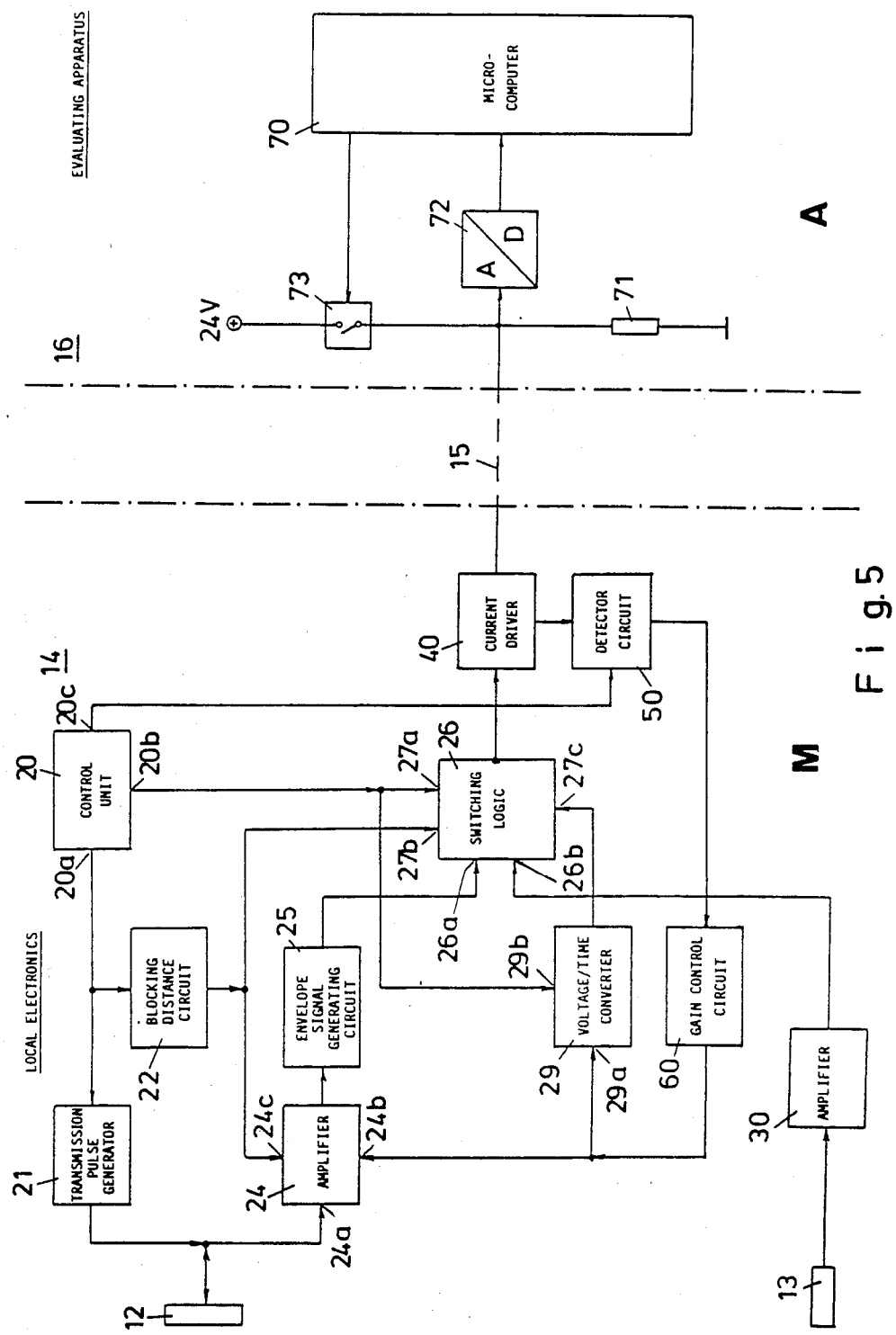
Figure 6:
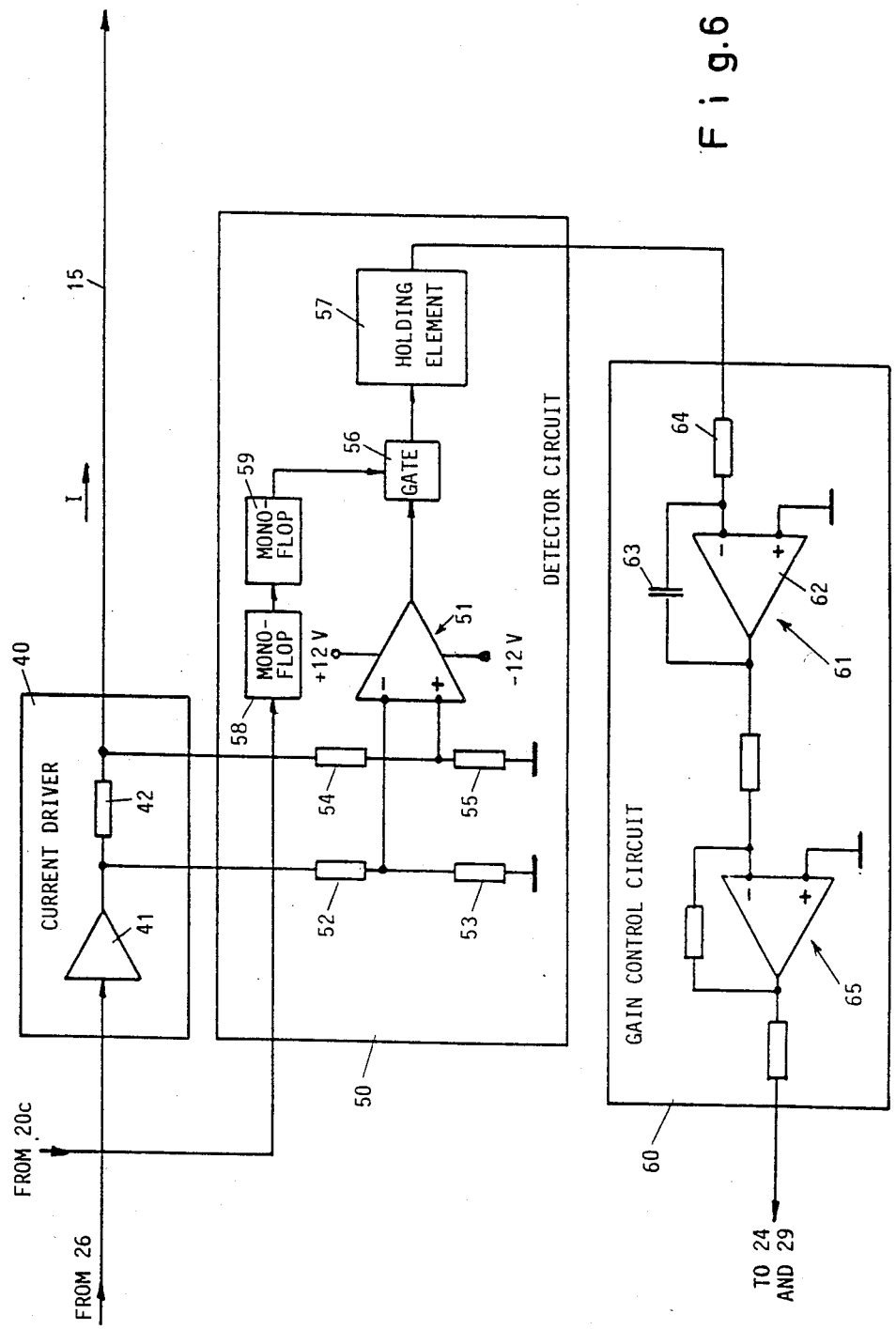
Figure 7:
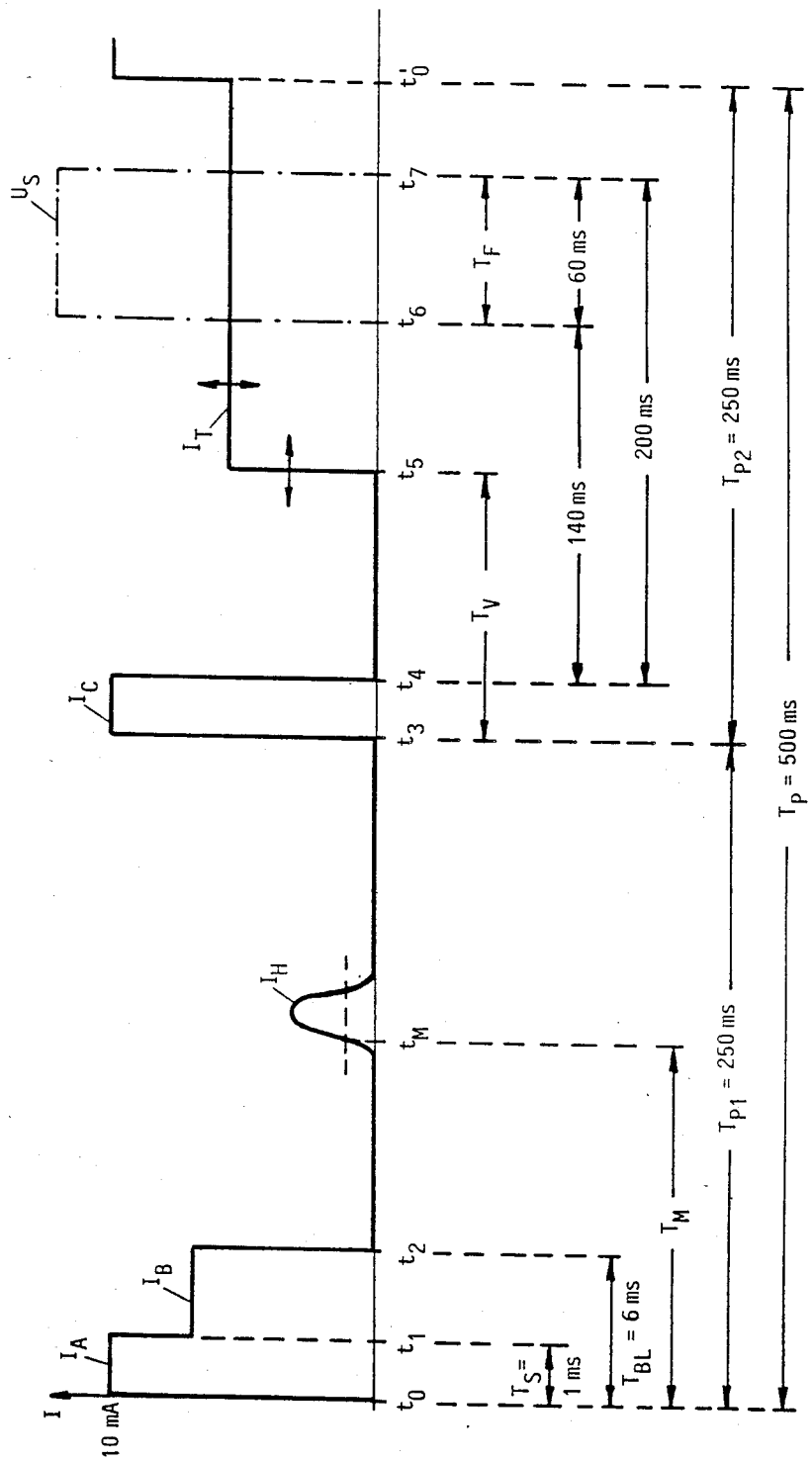

FIG. 3 shows diagrams of the time variation of various signals which occur in the circuit of FIG. 2, FIG. 4 is the time diagram of the signals transmitted via the connecting line in a transmission period, FIG. 5 is the block circuit diagram of the local electronics and the evaluating apparatus in a modified embodiment of the arrangement according to the invention, FIG. 6 shows the details of various components of the local electronics of FIG. 5 and FIG. 7 is the time diagram of the signals transmitted via the connecting line in a transmission period in the arrangement of FIGS. 5 and 6.

Figure 1:
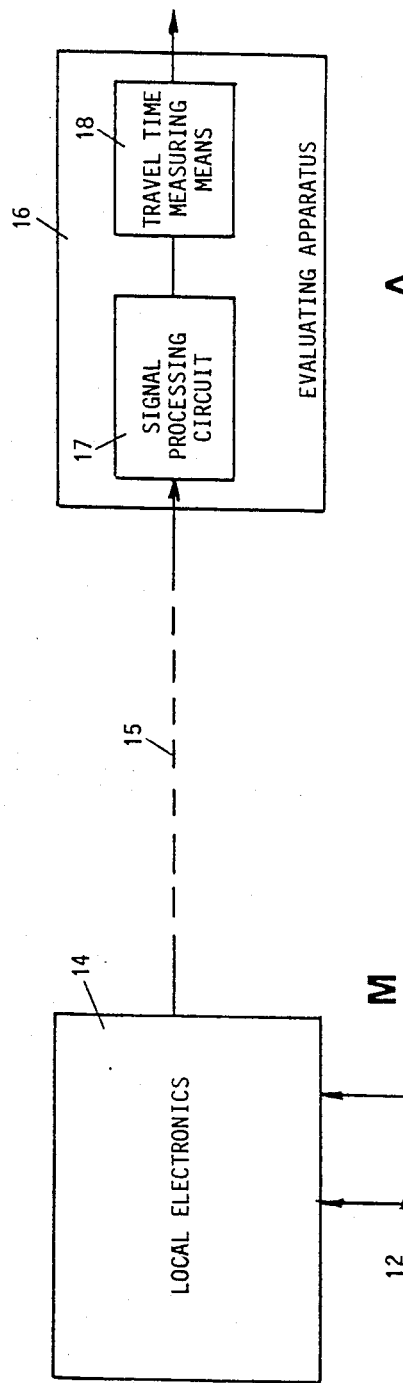
FIG. 1 is a fundamental diagram of an arrangement according to the invention for measuring the level in a container by means of an ultrasonic sounding device.

FIG. 1 shows a container 10 disposed at a measuring location M and containing a material 11. For measuring the level in the container 10 at the top of the container above the highest level which occurs an ultrasonic transducer 12 is disposed which generates periodically ultrasonic transmission pulses which are directed downwardly onto the material 11 disposed in the container and which receives the ultrasonic echo pulses reflected at the surface of the material 11 and converts them to electrical reception signals. The travel time of the ultrasonic pulses from the ultrasonic transducer 12 to the surface of the material 11 and back to the ultrasonic transducer 12 is, when the propagation speed of the ultrasonic waves is known, a measure of the distance covered by the ultrasonic waves in the container and thus also a measure of the level in the container. The propagation speed of the ultrasonic waves depends in particular upon the temperature of the propagation medium which in the case illustrated is the air above the material in the container. To take account of the influence of the temperature on the propagation speed in the container a temperature sensor 13 is disposed which furnishes an electrical output signal depending on the temperature in the container.

The ultrasonic transducer 12 and the temperature sensor 13 are connected to a local electronics system 14 which is also disposed at the measuring location M in the immediate vicinity of the container 10. The local electronics 14 supply the ultrasonic transducer 12 with electrical high-frequency transmission pulses and the transducer converts them to ultrasonic transmission pulses; the local electronics receive from the ultrasonic transducer 12 the electrical reception signals corresponding to the ultrasonic echo pulses. Furthermore, the local electronics 14 receive the output signal of the temperature sensor 13.

The local electronics 14 are connected via a connecting line 15 to the evaluating apparatus 16 which is disposed at an evaluation station A remote from the measuring location M. The evaluating apparatus 16 includes primarily a signal processing circuit 17 which is followed by a travel time measuring means 18. The signal processing circuit processes the signals which are transmitted by the local electronics 14 via the connecting line 15 in accordance with the evaluation to be made. The travel time measuring means 18 determines from the signals processed by the signal processing circuit 17 the travel time of the ultrasonic pulses 10 in the container 10 and furnishes at the output a signal which can be used either to display the level in the container 10 or to initiate switching operations depending on said level.

FIG. 2 shows the block circuit diagram of the electronic circuits contained in the local electronics 14. FIG. 2 also shows the ultrasonic transducer 12 and the temperature sensor 13 as well as the connecting line 15 which connects the local electronics 14 to the evaluating apparatus 16.

The local electronics 14 include a control unit 20 which controls the time sequence of all the operations in the local electronics. In particular, the control unit 20 furnishes at an output 20a periodic trigger pulses to a transmission pulse generator 21 whose output is connected to the ultrasonic transducer 12. Illustratively, the control unit 20 is a digital circuit that may be either a microprocessor, suitably programmed, or a digital logic network. Following each trigger pulse the transmission pulse generator 21 furnishes a high-frequency transmission pulse which has the desired optimum ultrasonic frequency and is converted by the ultrasonic transducer 12 to an ultrasonic transmission pulse. Illustratively, the transmission pulse generator 21 is a conventional circuit of the type normally used in known ultrasonic sounding systems. Such circuits are well known to those skilled in the art. The duration of each transmission pulse is small compared with the transmission period. The transmission period is itself larger than the greatest occurring travel time of the ultrasonic pulses in the container 10, i.e. the travel time when the container is empty or the level is the lowest possible. As will be explained hereinafter with the aid of FIG. 4 in the example described it is assumed that the maximum travel time occurring of the ultrasonic pulses in the container 10 from the ultrasonic transducer 12 to the surface of the material 11 and back to the ultrasonic transducer 12 is less than 250 ms, that the transmission period has a duration $T_P$ of 500 ms and that the duration $T_S$ of each transmission pulse is 1 ms. The control unit 20 thus furnishes at periodic intervals of 500 ms a trigger pulse to the transmission pulse generator 21 which thereupon transmits a high-frequency transmission pulse of 1 ms duration to the ultrasonic transducer 12.

The trigger pulses periodically furnished at the output 20a of the control unit 20 are also supplied to a blocking distance circuit 22. The blocking distance circuit 22, which in the simplest case is formed by a monoflop, furnishes following each trigger signal a blocking signal at its output. Illustratively, the blocking distance circuit 22 is a CD 4538 circuit, or its equivalent. The duration $T_{BL}$ of this blocking signal corresponds to the "blocking distance", i.e. the time in which the ultrasonic transducer 12 cannot receive any useful echo pulses. This is firstly the time in which the transmission pulses are emitted and secondly the dying-away time following each transmission pulse, in which the ultrasonic transducer dies down with decreasing amplitude. The dying away also produces at the connection of the ultrasonic transducer 12 an electrical signal and an echo pulse arriving during the dying away cannot be evaluated if the amplitude of the electrical reception signal originating therefrom is smaller than the amplitude of the dying-away signal. The blocking distance may vary considerably depending on the properties of the ultrasonic transducer, the ambient conditions (temperature) and the installation conditions. The duration of the blocking signal furnished by the blocking distance circuit 22 is thus dimensioned so that it exceeds with a safety factor the maximum occurring dying-away time. In the numerical example assumed above the blocking distance time $T_{BL}$ is for example 6 ms from the start of the transmission pulse.

The ultrasonic transducer 12 is connected to the input 24a of an amplifier 24 which amplifies the electrical reception signals which the ultrasonic transducer 12 furnishes on reception of each ultrasonic echo pulse. Illustratively, the amplifier 24 is a TCA 440 (manufactured by Siemens) based amplifier circuit, or its equivalent. The gain of the amplifier 24 can be controlled by a voltage applied to a gain control input 24b. Furthermore, the amplifier 24 has a blocking input 24c which is connected to the output of the blocking distance circuit 22 so that it is blocked for the duration of each blocking signal furnished by the blocking distance circuit 22. Thus, the high-frequency transmission pulses furnished by the transmission pulse generator 21 and the electrical oscillations of the amplifier 24 produced by the dying-away of the ultrasonic transducer 12 are not transmitted and at the output of the amplifier 24 only the echo signals arriving after expiry of the blocking distance appear.

In the level measuring in each transmission period only one useful reception signal is present which originates from the ultrasonic echo pulse reflected at the surface of the material 11. This reception signal is a high-frequency pulse which has the same carrier frequency as the high-frequency transmission pulse furnished by the transmission pulse generator 21 but the waveform of which, due to the transmission behaviour of the ultrasonic transducer 12 and the transmission conditions in the container 10, differs from that of the transmission pulse. The diagram A of FIG. 3 shows as example a high-frequency transmission pulse furnished by the transmission pulse generator 21, it being assumed that the transmission pulses are modulated in rectangular manner. The diagram B of FIG. 3 shows the reception signal at the output of the amplifier 24 corresponding to the received ultrasonic echo pulse. The time interval $T_M$ between the transmission pulse and the reception pulse corresponds to the travel time of the ultrasonic wave in the container 10 and thus denotes the filling level. The amplitude and the time variation of the echo signal reflect the transmission conditions in the container.

Connected to the output of the amplifier 24 is an envelope signal generating circuit 25 which furnishes output signals whose time variation corresponds to the envelope curves of the output signals of the amplifier 24. The diagram C of FIG. 3 shows the envelope signal which is obtained at the output of the envelope signal generating circuit 25 for the reception signal of the diagram B. The envelope signal is a voltage pulse whose time variation corresponds to the envelope curve of the high-frequency signal of the diagram B. This voltage pulse thus contains all the information which is necessary for the evaluation and assessment of the transmission conditions. The envelope signal generating circuit 25 may be formed in the simplest case by an amplitude demodulator which is possibly preceded by a band filter tuned to the carrier frequency of the reception signals. Illustratively, the envelope signal-generating circuit 25 can be similar to the circuit shown in FIG. 5 of the article by Huber and Riedell entitled "Kontinuierliche Bunkerfullstandsmessung mit dem Ultraschall-Echolot".

The output of the envelope signal generating circuit 25 is connected to a signal input 26a of a switching logic 26 to the output of which the connecting line 15 is connected. The switching logic 26 comprises a control input 27a which is connected to a second output 20b of the control unit 20. The switching logic 26 illustratively comprises a CD 4051 (manufactured by RCA) multiplexer-demultiplexer type circuit. A further control input 27b of the switching logic 26 receives the blocking signal from the output of the blocking distance circuit 22.

In addition, the output signal of the envelope curve generating circuit 25 is supplied to the input of a gain controller 28 which supplies to the gain control input 24b of the amplifier 24 a gain control voltage which tends to hold the amplitude of the envelope signals corresponding to the reception signals at a predetermined constant value. Illustratively, the gain controller 28 is similar to the gain control circuit 60 shown in FIG. 6 and decribed below. In this manner compensation is provided for the considerable fluctuations of the echo pulse amplitudes which are caused firstly by the different measured distances and secondly by different propagation conditions for the ultrasonic waves. Of significance in this connection is the fact that in level measuring and also in most other uses of echo sounding equipment in each transmission period only one useful echo signal is obtained which corresponds to a certain target distance which generally changes only slowly and uniformly. It is therefore easily possible to control the gain in the sense of keeping the amplitude of these useful echo pulses constant. If necessary, additional steps can be taken to suppress interference pulses or multiple echos.

However, this gain control results in loss of the information contained in the amplitude of the echo signals on the echo attenuation which the ultrasonic pulses undergo on their path from the ultrasonic transducer to the material surface and back to the ultrasonic transducer. Since this information can also be of significance to the evaluation of the echo signals in the evaluating apparatus, a separate information on the echo amplitude is additionally transmitted to the evaluating apparatus. For this purpose the gain control voltage furnished by the gain controller 28 is applied to the input 29a of a voltage/time converter 29 whose output is connected to a further control input 27c of the switching logic 26. A further input 29b of the voltage/time converter 29 is connected to the output 20b of the control unit 20. The voltage/time converter 29 furnishes after each signal applied to the input 29b an output signal whose duration $T_V$ depends on the gain control voltage applied to the input 29a. Illustratively, the voltage/time converter 29 is an operational amplifier circuit configured in a manner known to one of ordinary skill in the art as a voltage to time converter.

Finally, the output signal of the temperature sensor 13 is applied after amplification in an amplifier 30 to a further signal input 26b of the switching logic 26. Illustratively, amplifier 30 comprises one or more conventional operational amplifiers configured as an amplifier in converted fashion.

The switching logic 26 is an electronic switch-over device which under the control of the time control signals supplied by the control unit 20, the blocking distance circuit 22 and the voltage/time converter 29 connects the connecting line 15 in succession with various signal sources.

The diagram of FIG. 4 shows as a function of time the signals transmitted via the connecting line 15 in the course of a transmission period of duration $T_P = 500$ ms. To make the diagram clearer, the duration of various signals is not shown to the correct time scale.

According to the numerical example given above the duration of the transmission period $T_P$ is more than twice as great as the longest occurring travel time of the echo pulses. The transmission period is divided into two equally sized sections $T_{P1}$ and $T_{P2}$ of 250 ms duration. The section $T_{P1}$ serves for the transmission of the envelope signals corresponding to the echo pulses whilst in the section $T_{P2}$ the other signals necessary in the evaluating apparatus 16 for the evaluation of the envelope signals are transmitted. Of course, it is not essential for the two sections $T_{P1}$ and $T_{P2}$ to be of equal magnitude; for example, the section $T_{P2}$ reserved for the transmission of the remaining signals could be substantially shorter than the section $T_{P1}$ reserved for the reception and transmission of the echo pulses.

At the instant $t_0$ at the start of each transmission period the control unit 20 applies synchronously with the trigger pulse furnished by the output 20a to the control input 27a of the switching logic 26 a signal which brings the switching logic 26 into a position in which a constant dc voltage $U_A$, preferably the supply voltage $V_{CC}$, is applied to the line 15. The start of this voltage stage signalizes to the evaluating apparatus 16 the instant of the transmission of the ultrasonic transmission pulse and thus the start of the measuring time. The duration of the transmission of the dc potential $V_{CC}$ is preferably equal to the duration $T_S$ of the transmission pulse, i.e. in the numerical example assumed here 1 ms. This duration has been shown exaggerated in FIG. 4 compared with the duration $T_P$ of the transmission period.

After the transmission time $T_S$ the switching logic 26 at the instant $t_1$ and under the action of the blocking signal applied by the blocking distance circuit 22 to the control input 27b goes into a position in which the dc voltage applied to the connecting line 15 is brought to a lower value $U_B$ which is for example $\frac{2}{3} V_{CC}$. This condition is maintained for the duration of the blocking time $T_{BL}$ which is defined by the blocking distance circuit 22 and which in the numerical example given above is 6 ms from the start of the transmission pulse. As a result the evaluating apparatus 16 is informed of the duration of the blocking time. The blocking time $T_{BL}$ has also been shown exaggerated in FIG. 4.

After completion of the blocking time $T_{BL}$ at the instant $t_2$ the switching logic 26 connects the connecting line 15 to the signal input 26a. In the remaining part of the first section $T_{P1}$ of the transmission period following the blocking time the envelope signal $U_H$ corresponding to the echo pulse is thus transmitted to the evaluating apparatus 16. The evaluating apparatus 16 determines the time interval $T_M$ between the transmission instant $t_0$ and the instant $t_M$ in which the leading edge of the envelope signal $U_H$ has reached a predetermined threshold value and calculates therefrom the level in the container 12, taking account of the parameters transmitted with the aid of the other signals.

After 250 ms the control unit 20 at the instant $t_3$ again applies a signal to the control input 27a of the switching logic 27 and this signal effects the transmission of a synchronous pulse $U_C$ of 1 ms duration with the value of the supply voltage $V_{CC}$. This synchronous pulse $U_C$ indicates to the evaluating apparatus 16 the start of the second section $T_{P2}$ of the transmission period. The synchronous pulse $U_C$ is not however accompanied by a trigger pulse at the output 20a of the control unit 20 so that at this instant no transmission of an ultrasonic transmission pulse takes place and the blocking distance circuit 22 does not apply a blocking signal to the control input 27b. The voltage level on the connecting line 15 thus drops at the end of the synchronous pulse $U_C$ at the instant $t_4$ to 0 V. The lack of the voltage step of $\frac{2}{3} V_{CC}$ permits the evaluating circuit 16 to distinguish between the two sections $T_{P1}$ and $T_{P2}$ of the transmission period.

After the time $T_V$ which is defined by the output signal of the voltage/time converter 29 applied to the control input 27c the switching logic 26 establishes from the instant $t_5$ onwards the connection between the signal input 26b and the connecting line 15 so that the output voltage of the amplifier 30 is transmitted to the connecting line 15. The connecting line 15 thus carries in the remaining part of the section $T_{P2}$ a voltage $U_T$ which is characteristic of the temperature in the container detected by the temperature sensor 13. This voltage is maintained up to the instant $t_0'$ at which the next transmission period begins and a synchronous pulse with the voltage value $V_{CC}$ is again transmitted through the connecting line 15.

The time $T_V$ determined by the voltage/time converter 29 depends on the gain control voltage at the output of the amplifier control 28 and is thus a measure of the echo amplitude. The instant $t_5$ of the voltage jump between the value 0 V and the temperature voltage $U_T$ is thus displaced in dependence upon the echo amplitude. In the time section $T_{P2}$ the echo amplitude information is thus transmitted by a time signal and the temperature information by a voltage level.

In this manner, all the information required at the evaluation station is transmitted via the connecting line 15 by very low-frequency signals. The connecting line 15 can thus be in the form of a simple unshielded cable and the transmitted signals are not appreciably attenuated even if the connecting line has a considerable length.

Of course, the various information can also be transmitted in a different time sequence via the connecting line or the transmission mode can be interchanged as desired; for example, the echo amplitude can be expressed by a voltage value and the temperature by a time information. It is further possible in the time section $T_{P2}$ to transmit other information of interest with the aid of similar low-frequency signals to the evaluating apparatus.

The signal processing circuit 17 contained in the evaluating apparatus 16 is of course so constructed that it is able to process the envelope signals transmitted and the other signals transmitted. This construction and the construction of the travel time measuring means 18 need not be described in detail because it will not present any difficulty to the expert with the knowledge of the signals transmitted. For example, as an essential part of the signal processing circuit 17 and the travel time measuring means 18 a suitably programmed microcomputer may be used. In this case the transmitted signals are digitized in the evaluation station and stored and processed by the microcomputer.

With the aid of FIGS. 5 to 7 a modified embodiment of the level measuring arrangement will be described in which the gain of the amplifier 24 is controlled from the evaluation station A by signals which during the second sections of the transmission periods are transmitted via the same connecting line 15 in the opposite direction from the evaluating apparatus 16 to the local electronics 14.

FIG. 5 shows in the left-hand part the block circuit diagram of the local electrodes 14 disposed at the measuring location M and in the right-hand part the block circuit diagram of the evaluating apparatus 16 disposed at the evaluation station A and in between the connecting line 15 which is shown broken because it may be of any length.

The block circuit diagram of the local electronics 14 corresponds substantially to the illustration of FIG. 2. The circuit components which are not changed have been designated by the same reference numerals as in FIG. 2 and will not be described again. The local electronics 14 of FIG. 5 differs from those of FIG. 2 only in the following points:

Following the output of the switching logic 26 is a current driver 40 which converts the particular signal voltage furnished by the switching logic 26 to a current which is transmitted via the connecting line 15 to the evaluating apparatus 16. The connecting line 15 is thus no longer operated as voltage transmission line but as current loop. The diagram of FIG. 7 shows the time variation of the current I transmitted via the connecting line 15. It coincides with the time variation of the voltage diagram of FIG. 2. The current values $I_A$, $I_B$, $I_H$, $I_C$ and $I_T$ now correspond to the voltage values $U_A$, $U_B$, $U_H$, $U_C$ and $U_T$, respectively, of FIG. 2. The maximum current value, which corresponds to the positive supply voltage $V_{CC}$, is for example 10 mA.

Connected to the current driver 40 is a detector circuit 50 which also comprises a control input which is connected to a further output 20c of the control unit 20.

Instead of the gain controller 28 of FIG. 2 lying in a control loop a gain control circuit 60 is provided whose input is connected to the output of the detector circuit 50. The output of the gain control circuit 60 is connected in the same manner as the output of the gain controller 28 of FIG. 2 to the gain control input 24b of the amplifier 24 and to the input 29a of the voltage/time converter 29.

The evaluating apparatus 16 includes a microcomputer 70 which is so programmed that it executes the functions of the signal processing circuit 17 and the travel time measuring means 18 of FIG. 1. A resistor 71 connected in the evaluating apparatus 16 between the connecting line 15 and ground closes the current loop. The voltage drop across the resistor 71 is applied to the input of an analog/digital converter 72 whose digital output signals are applied to the microcomputer 70.

An output of the microcomputer 70 controls a switch 73 by which a voltage of +24 V can be applied to the connecting line 15. This voltage is substantially higher than the positive supply voltage $V_{CC}$ used in the local electronics of for example +12 V. For the transmission of a voltage pulse $U_S$ of +24 V by closing the switch 73 in the second section $T_{P2}$ of the transmission period a time window $T_F$ is provided which is placed such that the end of the variable time $T_V$ under no circumstances falls in the time window $T_F$. It is assumed in FIG. 7 that the maximum time $T_V$ is less than 140 ms. The time window $T_F$ starts 140 ms after the end of the synchronous pulse $I_C$ at the instant $t_6$ and has a duration of 60 ms so that it ends at the instant $t_7$ which is a time interval of 200 ms from the end of the synchronous pulse $I_C$.

The presence or absence of the voltage pulse $U_S$ during the time window $T_F$ represents the control information transmitted from the evaluating apparatus 16 to the local electronics. The application of the voltage pulse $U_S$ to the connecting line 15 by closing the switch 73 means "increase gain". The absence of the voltage pulse $U_S$ during the time $T_F$ means "reduce gain". The purpose of the detector circuit 50 in the local electronics 14 is to detect the presence or absence of a voltage pulse $U_S$ in each time window $T_F$ and cause the corresponding change of the gain of the amplifier 24 by the gain control circuit 60.

An embodiment of the current driver 40, the detector circuit 50 and the gain control circuit 60 is illustrated in greater detail in FIG. 6.

The current driver 40 includes an amplifier 41 which acts as voltage/current converter and to the output of which the connecting line 15 is connected via a resistor 42. Since the current I sent by the amplifier 41 via the line 15 is always positive (FIG. 7) it produces at the resistor 42 a voltage drop such that the terminal of the resistor 42 connected to the output of the amplifier 41 is always at the higher potential. The amplifier 41 is so designed that it becomes saturated at the positive supply voltage $V_{CC}$ of +12 V. If therefore in the evaluating apparatus 16 by closing the switch 73 a higher voltage than +12 V is applied to the connecting line 15 the amplifier 41 can no longer supply current and the polarity at the resistor 42 is reversed. This polarity reversal is detected by the detector circuit 50.

The detector circuit 50 includes a comparator 51 which is formed by an operational amplifier with differential input. The inverting input of the operational amplifier is connected to the tap of a voltage divider which is formed by two resistors 52, 53 and which is connected between the terminal of the resistor 42 connected to the amplifier 41 and ground. The non-inverting input of the operational amplifier is connected to the tap of the voltage divider which is formed by two resistors 54, 55 and which is connected between the terminal of the resistor 42 connected to the connecting line 15 and ground. The output of the operational amplifier carries a negative voltage when the potential at the inverting input is higher than the potential at the non-inverting input; when the potential conditions are reversed the output voltage of the operational amplifier becomes positive.

The output signal of the comparator 51 is transmitted via a gate circuit 56 to a holding element 57. The gate circuit 56 is controlled by a time control circuit which is formed by two monoflops 58 and 59 in cascade connection. The two monoflops 58 and 59 are triggered by negatively running pulse edges. The hold time of the monoflop 58 is 140 ms and the hold time of the monoflop 59 is 60 ms.

The trigger input of the monoflop 58 is connected to the output 20c of the control unit 20. The control unit 20 furnishes at the output 20c of each transmission period a pulse which coincides in time with the synchronous pulse $I_C$ (FIG. 7). The monoflop 58 is triggered by the trailing edge of this pulse. After expiry of its holding time of 140 ms it in turn triggers the monoflop 59. The output of the monoflop 59 is connected to the control input of the gate circuit 56 so that the latter is open for the duration of the holding time of the monoflop 59. As directly apparent from FIG. 7 the open time of the gate circuit 56 corresponds exactly to the time window $T_F$. Thus, in each transmission period the output voltage of the comparator 51 present during the time window $T_F$ is transmitted to the holding element 57 in which it is stored until the start of the time window in the next transmission period.

The gain control circuit 60 includes an integrator 61 which is formed in the usual manner by an operational amplifier 62 whose feedback circuit from the output to the inverting input contains a capacitor 63. The inverting input is connected via a resistor 64 to the output of the holding element 57 of the detector circuit 50 whilst the non-inverting input is applied to a fixed potential, e.g. ground potential. In accordance with the known mode of operation of such an integrator the output voltage of the operational amplifier 62 rises linearly when a constant negative voltage is applied to the input and falls linearly when a constant positive voltage is applied to the input. Following the integrator 61 there is an inverting amplifier 65 whose output supplies the gain control voltage to the amplifier 24 and to the voltage/time converter 29.

It is immediately apparent from the above description that the gain of the amplifier 24 in and after each time window in which the voltage pulse $U_S$ is applied to the connecting line 15 is continuously increased whilst in and after each time window in which the voltage pulse $U_S$ is absent it is continously decreased. This makes it possible to control the gain of the amplifier 24 from the evaluating apparatus 16.

It would of course also be possible, instead of the gain of the amplifier 24, to control another function of the local electronics by the voltage pulses $U_S$. In corresponding manner it is also possible to control several functions of the local electronics from the evaluating apparatus if in each transmission period a plurality of consecutive time windows are provided and in the local electronics for each time window a detector circuit is present which detects whether or not a voltage pulse is present in the associated time window. In every case by applying the increased voltage to the connecting line it is ensured that the control signals transmitted by the evaluating apparatus to the local electronics are clearly distinguishable from the envelope and information signals transmitted in the opposite direction. The transmission of the control signals in the second section of each transmission period ensures that the transmission of the envelope signals in the first section of the transmission period is not impaired.

We claim:

1. A method of signal transmission between an ultrasonic echo sounding apparatus disposed at a measuring location and an evaluation station remote from the measuring location, ultrasonic transmission pulses being transmitted at the measuring location in successive transmission periods and the ultrasonic echo pulses received after reflection at a target being converted to electrical reception signals, comprising the steps of generating, at the measuring location, from said electrical reception signals electrical envelope signals which represent the envelope curves of the echo pulses and transmitting said envelope signals via a connecting line to the evaluation station in a first station section of each transmission period, the duration of said first section being at least equal to the maximum travel time of the ultrasonic transmission and echo pulses, said envelope signals being evaluated at the evaluation station for determining the target distance from the travel time of the ultrasonic pulses, generating at the measuring location at least one low-frequency electrical signal which is characteristic of a propagation medium parameter necessary for the evaluation of the envelope signals and transmitting said low-frequency electrical signal via the same connecting line to the evaluation station in a second section of the transmission period, and transmitting in the second section of the transmission period at least one control signal via the same connecting line from the evaluation station to the measuring location, which said control signal is distinguishable from the low-frequency electrical signal transmitted in the same second section of the transmission period via the same connecting line.

2. A method according to claim 1 in which at least one of the electrical signals transmitted during the second section of each transmission period is a direct current of variable current size.

3. The method according to claim 1 wherein at the start of each section of the transmission period an electrical signal designating said start is transmitted via the same connecting line to the evaluation station.

4. The method according to claim 1 wherein in the second section of each transmission period an electrical signal characteristic of the temperature of the propagation medium of the ultrasonic pulses is transmitted to the evaluation station.

5. The method according to claim 1 wherein in the second section of each transmission period an electrical signal characteristic of the amplitude of the received echo pulses is transmitted to the evaluation station.

6. The method according to claim 5 wherein the electrical signal characteristic of the amplitude of the received echo pulses is derived from the gain control voltage of a gain control circuit contained in a reception circuit of said echo sounding apparatus, which gain control circuit regulates the envelope signals to a constant level.

7. The method according to claim 1 wherein at least one of the electrical signals transmitted during the second section of each transmission period is a DC voltage of variable amplitude.

8. The method according to claim 1 wherein at least one of the electrical signals transmitted during the second section of each transmission period is represented by a time information.

9. The method according to claim 8 wherein the time information is represented by the instant of the switching over from one amplitude value to another amplitude value.

10. The method according to claim 1 wherein to generate each control signal a voltage which is higher than any voltage occurring during the transmission of the low-frequency electrical signals on the connecting line is applied during a predetermined time window to the connecting line.

11. An arrangement for signal transmission via a connecting line between an ultrasonic echo sounding apparatus disposed at a filling material measuring location and an evaluation station remote from the filling material measuring location, said ultrasonic echo sounding apparatus comprising means for generating ultrasonic pulses, local electronics including a transmission pulse generator which generates periodic electrical high-frequency transmission pulses in successive transmission periods and the output of which is connected to the ultrasonic pulse generating means, means for sensing ultrasonic echos and generating electrical echo signals therefrom, an amplifier whose input is connected to said ultrasonic echo sensing means, an envelope signal generating circuit connected to the output of said amplifier and generating envelope signals which represent the envelope curves of the output signals of the amplifier, means for connecting the output of said envelope signal generating circuit to the connecting line during a first section of each transmission period for the transmission of said envelope signals via said connecting line to said evaluation station, said evaluation station comprising an envelope signal processing circuit for evaluating said envelope signals, said local electronics further including at least one further signal source furnishing a low-frequency electrical signal characteristic of a parameter necessary for the evaluation of said envelope signals by said envelope signal processing circuit, and means for connecting the output of said further signal source to the connecting line during a second section of each transmission period for the transmission of said low-frequency electrical signal via said connecting line to said evaluation station.

12. The arrangement according to claim 11 wherein one of the further signal sources comprises a temperature sensor which furnishes a low-frequency electrical signal representative of the temperature measured by said temperature sensor.

13. The arrangement according to claim 11 wherein the gain of the amplifier contained in the local electronics is variable by a gain control voltage and one of the further signal sources supplies a signal dependent on the gain control voltage to the switching logic.

14. The arrangement according to claim 13, and further including a voltage/time converter which supplies a time signal dependent on the gain control voltage to a control input of the switching logic.

15. The arrangement according to claim 13, wherein the local electronics include a gain controller which supplies to the amplifier a gain control voltage which regulates the level of the envelope signals to a predetermined value.

16. The arrangement according to claim 11 wherein in the evaluation station a means is provided for applying at least one control signal during a predetermined time window in the second stations of each transmission period to the connecting line and that in the local electronics a detector circuit is provided which responds to the presence of the control signal during the predetermined time window in each transmission period.

17. The arrangement according to claim 16 wherein the means for applying at least one control signal includes a switch by which to the connecting line a voltage can be applied which is higher than any voltage occurring during the transmission of the low-frequency electrical signals on the connecting line.

18. The arrangement according to claim 17 wherein the connecting line is connected as a current loop to the output of a current driver disposed in the local electronics.

19. The arrangement according to claim 16 wherein in the local electronics a gain control circuit is provided which supplies to the amplifier a gain control voltage dependent on the output signal of the detector circuit.

20. The arrangement according to claim 11 wherein said connecting means is a switching logic controlled by a timing control unit.

21. The arrangement according to claim 20 wherein the timing control unit synchronously with the generation of a high-frequency transmission pulse at the start of the first section of each transmission period initiates the transmission of a first synchronous pulse via the connecting line and at the start of the second section of each transmission period the transmission of a second synchronous pulse via the connecting line by the switching logic.

22. The arrangement of claim 11 wherein the means for generating ultrasonic pulses comprises an ultrasonic transducer and the means for sensing ultrasonic echos comprises an ultrasonic transducer.

23. The arrangement of claim 22 wherein the same ultrasonic transducer comprises the means for generating ultrasonic pulses and the means for sensing ultrasonic echos.

24. The arrangement of claim 22 wherein separate ultrasonic transducers comprise the means for generating ultrasonic pulses and the means for sensing ultrasonic echos.

* * * * *

UNITED STATES PATENT AND TRADEMARK OFFICE
CERTIFICATE OF CORRECTION

PATENT NO. : 4,700,569

DATED : October 20, 1987

INVENTOR(S) : Bernhard Michalski et al

It is certified that error appears in the above-identified patent and that said Letters Patent is hereby corrected as shown below:

On the front page of the patent, under "References Cited", the following three references should be added:

German Patent Disclosure 28 17 247, Dated 1978

German Patent Disclosure 19 15 956, Dated 1976

Publication entitled "Kontinuierliche Bunkerfullstandsmessung mit dem Ultraschall-Echolot", Von Heinrich Huber and Hans-Dieter Riedel, Siemens-Zietschrift 42 (1968) Heft 1, pages 18-22

Signed and Sealed this

Thirteenth Day of September, 1988

*Attest:*

DONALD J. QUIGG

*Attesting Officer*      *Commissioner of Patents and Trademarks*